(12) United States Patent
Azuma

(10) Patent No.: US 12,427,552 B2
(45) Date of Patent: Sep. 30, 2025

(54) FOREIGN PARTICLE REMOVING METHOD, FORMATION METHOD, ARTICLE MANUFACTURING METHOD, FOREIGN PARTICLE REMOVING APPARATUS, AND SYSTEM

(71) Applicant: CANON KABUSHIKI KAISHA, Tokyo (JP)

(72) Inventor: Hisanobu Azuma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 18/299,319

(22) Filed: Apr. 12, 2023

(65) Prior Publication Data

US 2023/0347391 A1    Nov. 2, 2023

(30) Foreign Application Priority Data

Apr. 27, 2022   (JP) ................................. 2022-073675

(51) Int. Cl.
  *B08B 7/00*  (2006.01)
  *B29C 35/08*  (2006.01)
(52) U.S. Cl.
  CPC ........ *B08B 7/0028* (2013.01); *B29C 35/0805* (2013.01); *B29C 2035/0827* (2013.01)
(58) Field of Classification Search
  CPC ... B08B 7/0028; B08B 7/008; B29C 35/0805; B29C 2035/0827
  See application file for complete search history.

(56) References Cited

U.S. PATENT DOCUMENTS

| 6,048,409 A | 4/2000 | Kanno et al. |
| 8,202,463 B2 | 6/2012 | Yoneda et al. |
| 2009/0267267 A1 | 10/2009 | Yoneda et al. |
| 2013/0224322 A1 | 8/2013 | Shizawa et al. |
| 2017/0184958 A1* | 6/2017 | Kawamura ........... G03F 7/0002 |

(Continued)

FOREIGN PATENT DOCUMENTS

| JP | H08318181 A | 12/1996 |
| JP | 2007258462 A | 10/2007 |

(Continued)

OTHER PUBLICATIONS

Machine Translation of JP2016072517A (Year: 2016).*

(Continued)

*Primary Examiner* — Sharidan Carrillo
(74) *Attorney, Agent, or Firm* — ROSSI, KIMMS & McDOWELL LLP

(57) ABSTRACT

The present invention provides a foreign particle removing method of removing a foreign particle on a first member, comprising: supplying a composition to a supply region on the first member; setting a target region wider than the supply region on the first member, and pressing a second member against the composition supplied on the first member in the supplying; curing the composition on the first member after the pressing, in a state in which the composition and the second member are in contact with each other; and separating the second member from the first member after the curing, in a state in which the second member and the composition adhere to each other, thereby separating the composition from the target region of the first member.

13 Claims, 10 Drawing Sheets

(56) References Cited

U.S. PATENT DOCUMENTS

2023/0149982 A1* 5/2023 Yonekawa ............ B08B 7/0014
                                                        134/6
2023/0382019 A1* 11/2023 Kondo ................ B29C 35/0288

FOREIGN PATENT DOCUMENTS

| JP | 5121549 B2 | 1/2013 |
| JP | 2015223770 A | 12/2015 |
| JP | 2016072517 A1 * | 5/2016 |
| JP | 5982996 B2 | 8/2016 |
| JP | 6417761 B2 | 11/2018 |
| JP | 6480219 B2 | 3/2019 |
| JP | 6765488 B2 | 10/2020 |
| KR | 1020130014055 A | 2/2013 |

OTHER PUBLICATIONS

Machine Translation of TW201324597A (Year: 2013).*
Office action issued in U.S. Appl. No. 18/299,255 mailed on Feb. 20, 2025.
Azuma. Copending U.S. Appl. No. 18/299,255, filed Apr. 12, 2023.

* cited by examiner

FIG. 4A
FIG. 4B
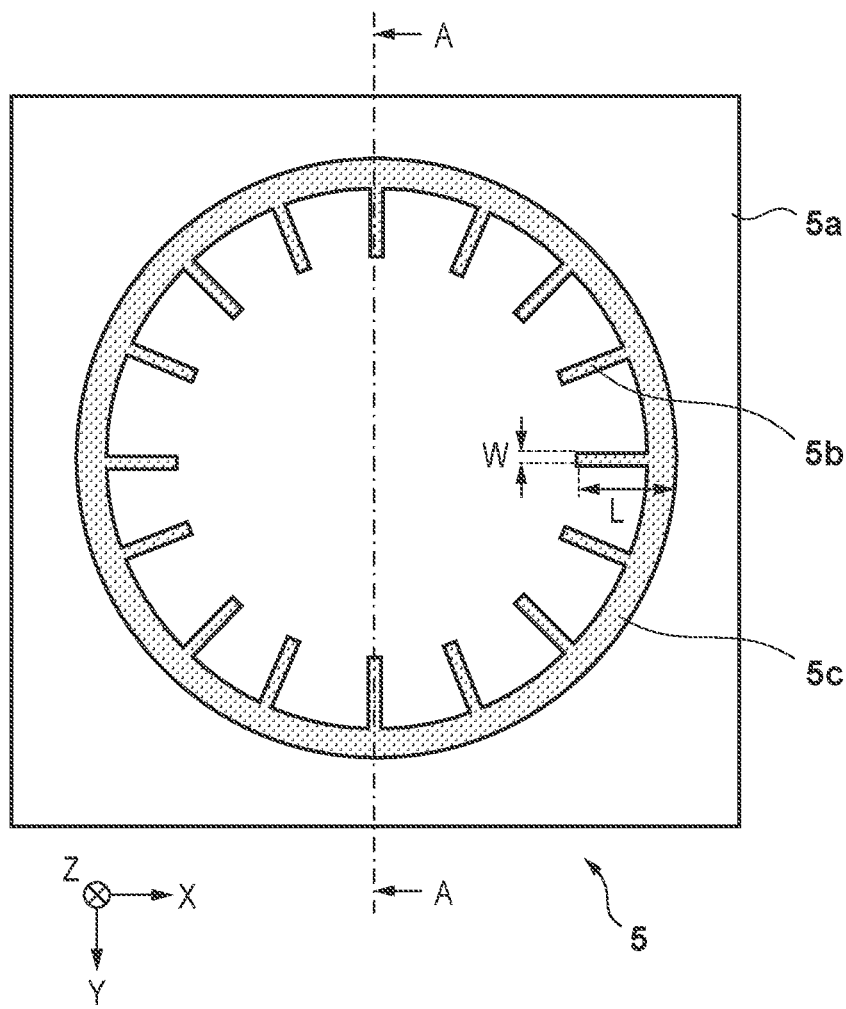
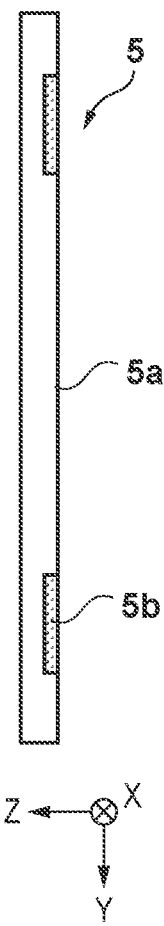

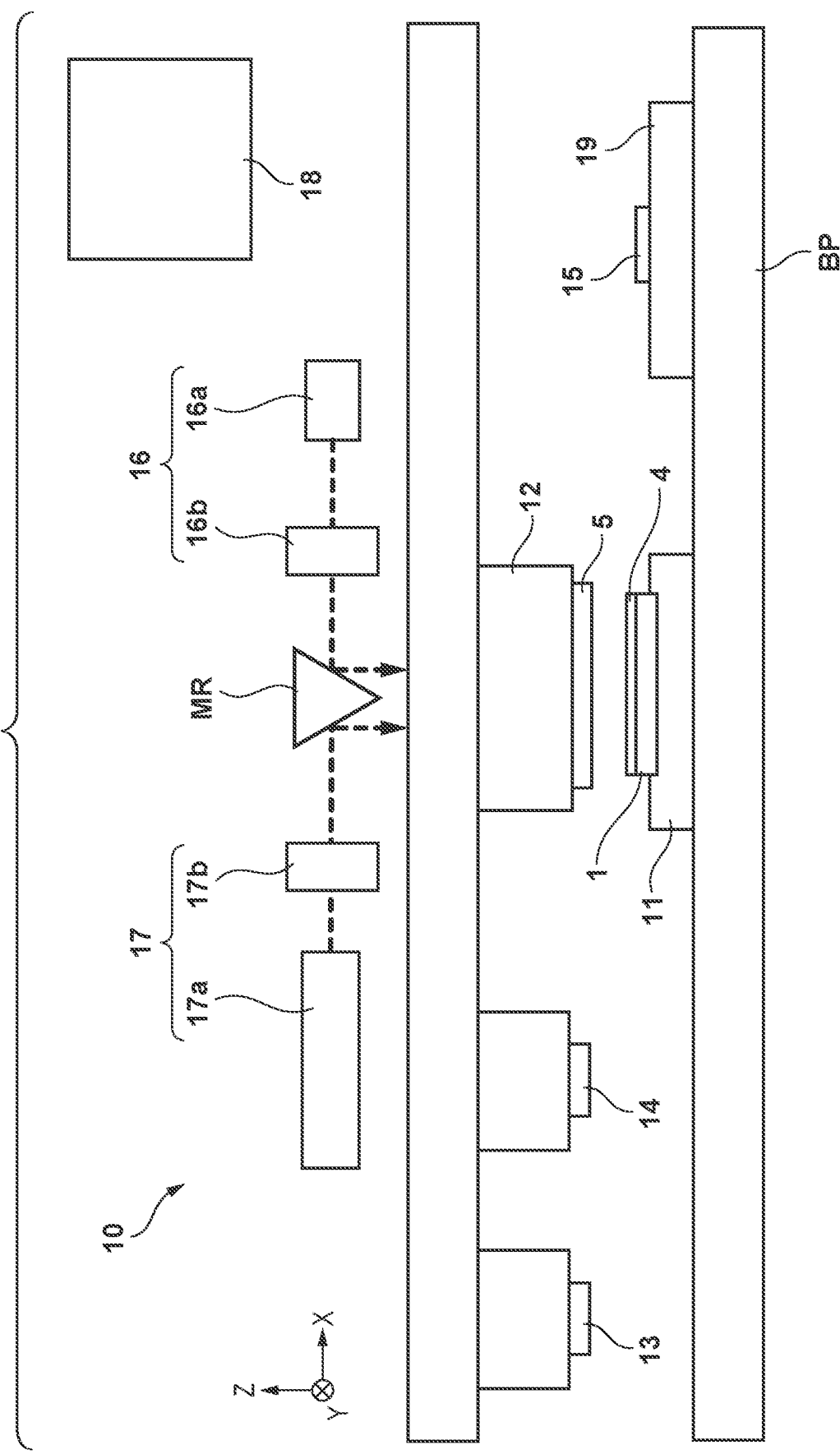

FOREIGN PARTICLE REMOVING METHOD, FORMATION METHOD, ARTICLE MANUFACTURING METHOD, FOREIGN PARTICLE REMOVING APPARATUS, AND SYSTEM

BACKGROUND OF THE INVENTION

Field of the Invention

The present invention relates to a foreign particle removing method, a formation method, an article manufacturing method, a foreign particle removing apparatus, a system, and a template.

Description of the Related Art

In the manufacture of semiconductor devices, MEMS, and the like, a member such as a semiconductor substrate is cleaned. Conventionally, megasonic cleaning, two-fluid cleaning, RCA cleaning using a chemical solution, or the like is applied to cleaning of the member like this. Examples of the cleaning principles of these cleaning methods are a cleaning method of removing foreign particles adhered on a substrate by using the physical force of a hydrodynamic force (see Japanese Patent Laid-Open No. 8-318181), and a cleaning method of removing foreign particles in a lift-off manner by using the chemical action (for example, the etching effect) of a chemical solution (see Japanese Patent Laid-Open No. 2007-258462). Also, as a member cleaning method, each of Japanese Patent Publication Nos. 6765488 and 6480219 describes a cleaning method of forming a solid film on a member so that the solid film entraps foreign particles on the member, and removing the solid film by using a chemical solution.

Recently, as micropatterning in the manufacture of semiconductor devices and the like progresses, cleaning of a member such as a semiconductor substrate is required to remove even foreign particles having very small particle sizes (for example, a few tens of nm or less) from the member. However, in the cleaning method using the hydrodynamic force as described in Japanese Patent Laid-Open No. 8-318181, if the hydrodynamic force is increased in order to remove foreign particles having small particle sizes or an unnecessary material such as a polymer adhered on a member, a microstructure formed as an underlayer (underlying pattern) on the member is sometimes damaged. This damage to the underlayer of the member can similarly occur in the cleaning method using the chemical reaction of a chemical solution as described in Japanese Patent Laid-Open No. 2007-258462 as well. Therefore, the abovementioned cleaning methods are beginning to reach the limit of application regarding to the removal of foreign particles having small particle sizes. In addition, the cleaning methods described in Japanese Patent Publication Nos. 6765488 and 6480219 have the problems that foreign particles sometimes adhere on a member again when dissolving (removing) the solid film by using a chemical solution, and the environmental load and the cost burden of waste liquid treatment and the like are large.

As a member cleaning method, therefore, a cleaning method (also called a dry cleaning method in some cases) of removing foreign particles on a member by using an imprint system instead of using a chemical solution is attracting attention. As an example, Japanese Patent No. 5121549 describes a cleaning method of removing foreign particles on a template by pressing the template against a resin applied on a dummy wafer, and separating the template from the resin after the resin is cured. Also, Japanese Patent No. 5982996 describes a cleaning method of forming a resin film by bringing a planarizing member into contact with a resin applied on a mold as an object of foreign particle removal, curing the resin film, releasing the planarizing member from the resin film, and releasing the resin film from the mold. In the cleaning methods using the imprint system as described above, it is desirable to efficiently remove foreign particles on the member.

SUMMARY OF THE INVENTION

The present invention provides, for example, a technique capable of efficiently removing foreign particles on a member.

According to one aspect of the present invention, there is provided a foreign particle removing method of removing a foreign particle on a first member, comprising: supplying a composition to a supply region on the first member; setting a target region wider than the supply region on the first member, and pressing a second member against the composition supplied on the first member in the supplying, such that the composition on the first member spreads over the target region and entraps a foreign particle in the target region; curing the composition on the first member after the pressing, in a state in which the composition and the second member are in contact with each other; and separating the second member from the first member after the curing, in a state in which the second member and the composition adhere to each other, thereby separating the composition from the target region of the first member.

Further features of the present invention will become apparent from the following description of exemplary embodiments with reference to the attached drawings.

BRIEF DESCRIPTION OF THE DRAWINGS

FIGS. 4A and 4B are views showing a configuration example of a template;

FIG. 5 is a schematic view showing a configuration example of a foreign particle removing apparatus of the first embodiment;

DESCRIPTION OF THE EMBODIMENTS

Figure 1:
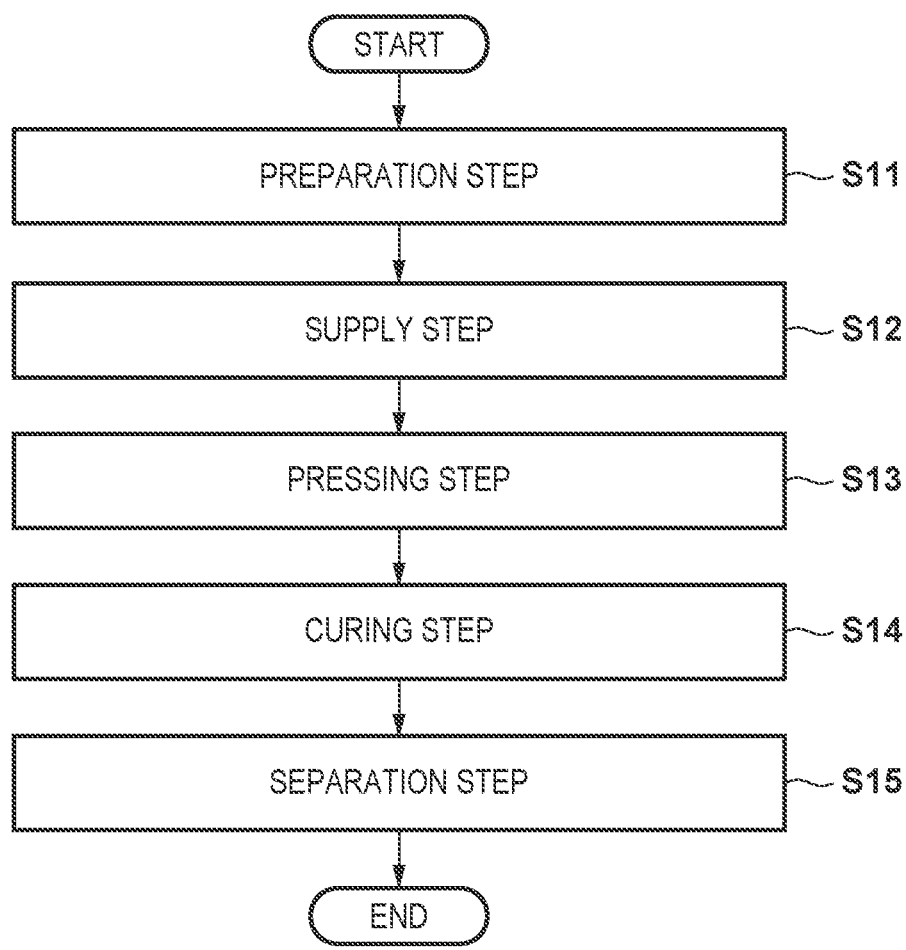
FIG. 1 is a flowchart showing a foreign particle removing method of the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In the specification and the accompanying drawings, directions will be indicated on an XYZ coordinate system in which directions parallel to the surface (upper surface) of a member as an object of foreign particle removal are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are θX, θY, and θZ, respectively. Control or driving (movement) concerning the X-axis, the Y-axis, and the Z-axis means control or driving (movement) concerning a direction parallel to the X-axis, a direction parallel to the Y-axis, and a direction parallel to the Z-axis, respectively. In addition, control or driving concerning the θX-axis, the θY-axis, and the θZ-axis means control or driving concerning a rotation about an axis parallel to the X-axis, a rotation about an axis parallel to the Y-axis, and a rotation about an axis parallel to the Z-axis, respectively.

First Embodiment

A foreign particle removing method of the first embodiment according to the present invention will be explained below. The foreign particle removing method of this embodiment is a method of removing foreign particles on a member (first member), more specifically, a cleaning method (so-called dry cleaning method) of removing foreign particles on the member without using any chemical solution.

Foreign Particle Removing Method

The foreign particle removing method (cleaning method) of this embodiment will be explained below with reference to FIGS. 1 and 2A to 2F. FIG. 1 is a flowchart showing the foreign particle removing method of this embodiment. FIGS. 2A to 2F are schematic views for explaining steps of the foreign particle removing method of this embodiment. Note that examples shown in FIGS. 1 and 2A to 2F are merely typical examples, and the present invention is not limited to the examples shown in FIGS. 1 and 2A to 2F.

First, in step S11 (a preparation step), a member 1 (a first member) as an object of foreign particle removal is prepared. In the following explanation, the member 1 as an object of foreign particle removal will be referred to as "a target member 1" in some cases. The preparation step can also be understood as a step for loading a target member 1 into a foreign particle removing apparatus for removing foreign particles on the target member 1. A configuration example of the foreign particle removing apparatus will be described later.

Figure 2A:
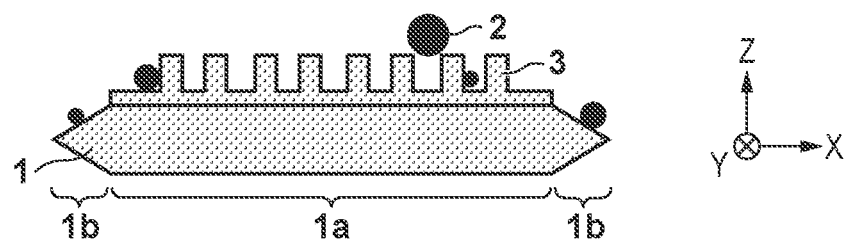
FIGS. 2A to 2F are schematic views for explaining steps of the foreign particle removing method of the first embodiment in chronological order.

As shown in FIG. 2A, the target member 1 can be a substrate on which a pattern is formed in a lithography step of manufacturing a semiconductor device or a flat panel display. Examples of the substrate are a semiconductor wafer or MEMS wafer on which a pattern (underlying pattern) is formed, a power semiconductor wafer, a display glass substrate (glass plate), or a bio-element. In this embodiment, an example in which a substrate is applied as the target member 1 will be explained. However, the target member 1 can also be an original plate to be used to form a pattern on a substrate in the lithography step. Examples of the original plate are an EUV exposure mask, a semiconductor exposure mask, a semiconductor imprint mold (template), a MEMS exposure mask, a power semiconductor exposure mask, and a display exposure mask. Note that MEMS is the abbreviation for Micro Electro Mechanical System, and EUV is the abbreviation for Extreme Ultraviolet.

In the example shown in FIG. 2A, foreign particles 2 (particles) having various sizes adhere on the top surfaces (upper surfaces) and the bottom surfaces (lower surfaces) of a pattern 3 already formed in a pattern portion 1a of the target member 1 and in a peripheral portion 1b of the target member 1. It is particularly difficult to remove extremely small foreign particles having particle sizes of 30 nm or less and foreign particles adhered on the bottom surfaces of the pattern 3 by the conventional cleaning methods such as megasonic cleaning and two-fluid cleaning. The pattern portion 1a indicates a portion (region) of the target member 1 in which the pattern 3 is formed. In this embodiment, the pattern 3 formed in the pattern portion 1a is configured as a pattern with concave and convex portions obtained by repetitively (for example, periodically) forming concave and convex portions. Also, the peripheral portion 1b is an edge portion surrounding the pattern portion 1a and indicates a portion (region) where bevel processing (for example, chamfering) is performed. In the following explanation, the peripheral portion 1b of the target member 1 will be referred to as "the bevel portion 1b" in some cases.

Figure 2B:
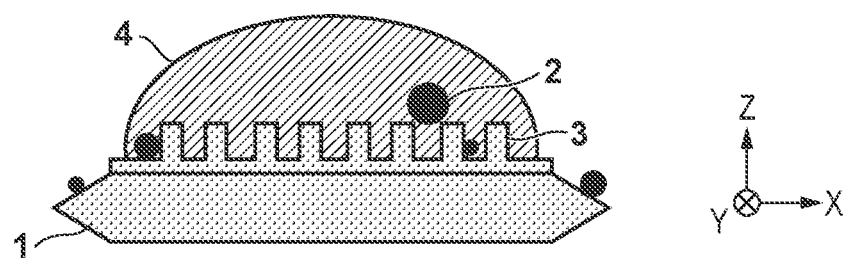

Then, in step S12 (a supply step), as shown in FIG. 2B, a composition 4 for entrapping and enclosing the foreign particles 2 on the target member 1 is supplied onto the target member 1 (a supply region). The composition 4 is supplied onto the target member 1 in a state in which the composition 4 has fluidity (that is, in a liquid state). Also, to avoid the composition 4 from extending outside the target member 1 (the bevel portion 1b), the composition 4 is preferably not supplied on the bevel portion 1b, that is, the composition 4 is preferably supplied only on the pattern portion 1a of the target member 1 (that is, a portion except for the bevel portion).

As the composition 4, a curable composition (for example, a resin) to be cured by receiving curing energy is used. The curable composition is a composition cured by light irradiation or heating. Among these, a photo-curable composition (photo-curable resin) cured by light irradiation contains at least a polymerizable compound and a photopolymerization initiator, and may further contain a nonpolymerizable compound or a solvent, as needed. The polymerizable compound is a compound that reacts with a polymerizing factor (a radical or the like) generated from the photopolymerization initiator and forms a film made of a polymer compound by a chain reaction (polymerization reaction). An example of the polymerizable compound is a radical polymerizable compound. The polymerizable compound is preferably a compound having one or more acryloyl groups or methacryloyl groups, that is, a (meth)acryloyl compound. The nonpolymerizable compound is at least one material selected from the group consisting of a sensitizer, a hydrogen donor, an internal mold release agent, a surfactant, an antioxidant, and a polymer component. Note that the viscosity (the viscosity at 25° C.) of the composition 4 is, for example, from 1 mPa·s (inclusive) to 100 mPa·s (inclusive).

In this embodiment, the composition 4 can be supplied (applied) on the target member 1 by using an apparatus that discharges the composition 4 by an inkjet method. However, the method of supplying (applying) the composition 4 on the target member 1 is not limited to the inkjet method, and it is possible to use any method capable of controlling the supply amount (for example, the coating film thickness of the composition 4) of the composition 4 onto the target member 1. For example, the composition 4 can be supplied on the target member 1 by using dispenser coating, spin coating, various printing methods such as screen printing, gravure printing, and offset printing, and dip coating.

Also, the supply amount of the composition 4 to be supplied on the target member 1 is preferably decided (set) based on the size of the foreign particle 2 adhered on the target member 1, such that the film thickness of the composition 4 formed on the target member 1 through a pressing step (to be described later) becomes larger than the size of the foreign particle 2. The size of the foreign particle 2 can be a measurement value obtained by measuring (inspecting) the size of the foreign particle 2 adhered on the target member 1 in advance, and can also be a predicted value obtained from a calculation (simulation) based on the empirical rules.

The wettability of the surface (upper surface) of the target member 1 is preferably as high as possible so that air bubbles are not involved between the target member 1 and the composition 4 and/or the composition 4 easily spreads on the target member 1. That is, it is favorable to minimize the contact angle between the target member 1 and the composition 4. The allowable range of this contact angle is preferably 2° or less, and more preferably 1° or less.

For this purpose, before the supply step (step S12), a process (lyophilization process (hydrophilization process)) of lyophilizing (hydrophilizing) the surface of the target member 1 with respect to the composition 4 is preferably performed on the target member 1. This lyophilization process includes a process of removing organic contamination components on the target member 1. Examples of the lyophilization process are baking, plasma ashing, atmospheric plasma treatment, alkali cleaning, and ozone water washing. As the lyophilization process, this embodiment can use the atmospheric plasma treatment that can be implemented with a simple apparatus configuration. When the target member 1 is sufficiently lyophilic, this lyophilization process can be omitted. When performing the lyophilization process, the etching amount is preferably so selected as to remove contamination components on the top surface layer as long as the surface layer of the target member 1 is not damaged. When the composition 4 is supplied on the target member 1 after the surface of the target member 1 is lyophilized in advance as described above, the capillary force allows the composition 4 to easily penetrate narrow channels (gaps) between the target member 1 and the foreign particles 2 adhered on it. Note that the lyophilization process can also be performed by an external apparatus of the foreign particle removing apparatus before the preparation step (step S11), for example, before the target member 1 is loaded into the foreign particle removing apparatus. Note also that a separation layer (for example, a fluorine-based layer) for facilitating separation (release) between the target member 1 and the composition 4 in a separation step (step S15) (to be described later) can be formed on the target member 1 before the supply step (step S12).

Figure 2C:
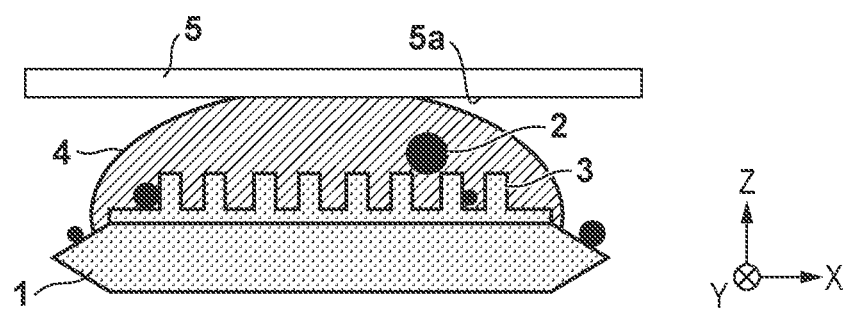
Figure 2D:
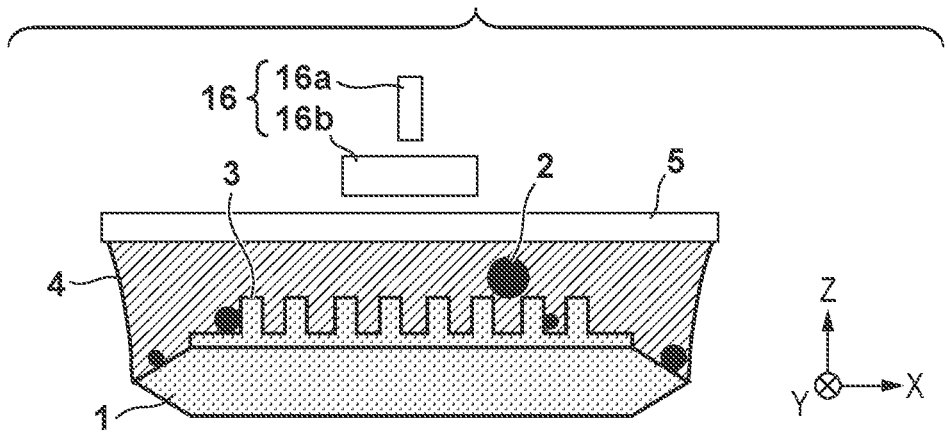

Subsequently, in step S13 (a pressing step), a template 5 is pressed against the composition 4 on the target member 1 so that the composition 4 spreads over a target range (target region) of the target member 1. More specifically, in this pressing step, after the template 5 is brought into contact with the composition 4 supplied on the target member 1 in the supply step as shown in FIG. 2C, the composition 4 is spread on the target member 1 by the template 5 as shown in FIG. 2D. In this step, the template 5 is pressed against the composition 4 on the target member 1 so that the composition 4 spreads over the target range of the target member 1 and entraps the foreign particles 2 within the target range. Note that the pressing step can be executed by a driving mechanism that drives the target member 1 and the template 5 relative to each other.

The target range of the target member 1 is a range within which foreign particles must be removed, and can include at least a part of the bevel portion 1b in addition to the pattern portion 1a. In this embodiment, the target range is set as a range including the whole bevel portion 1b, that is, set on the whole surface (upper surface) of the target member 1. Also, the template 5 is a member (second member) playing the role of a handle for spreading, on the target member 1, the composition 4 supplied on the target member 1 in the supply step, and for separating (releasing) the composition 4 cured in a curing step (to be described later) from the surface of the target member 1. The template 5 is preferably formed to have a size larger than the target member 1 (the target range), in order to effectively clean the whole of the end portion (edge) and the bevel portion 1b of the target member 1.

Figure 3A:
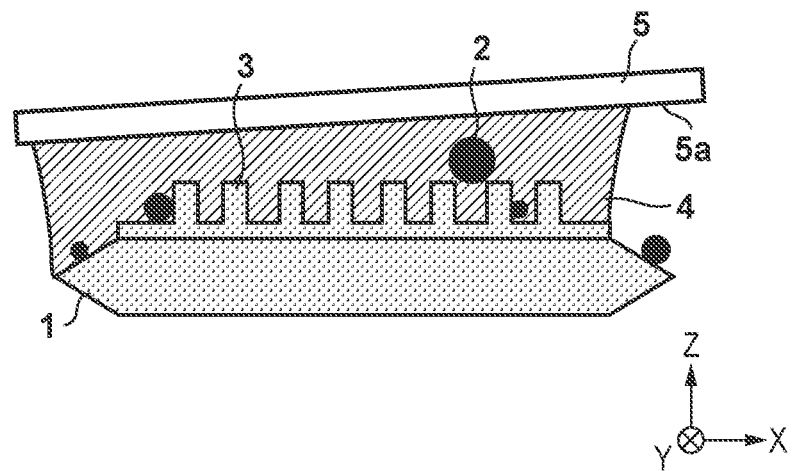
FIGS. 3A and 3B are views for explaining a problem in a pressing step.
Figure 3B:
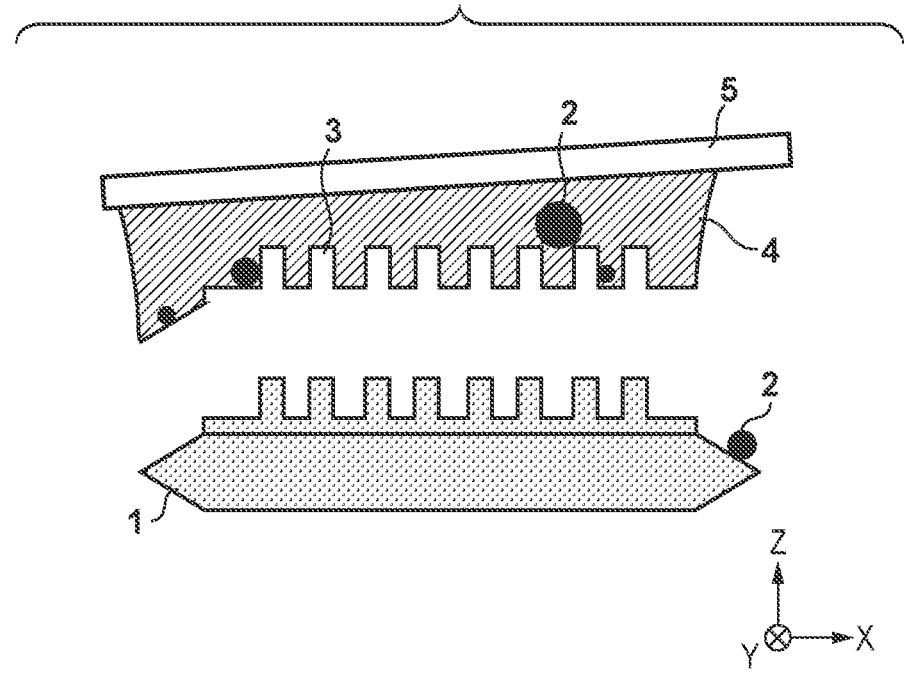
Figure 6A:
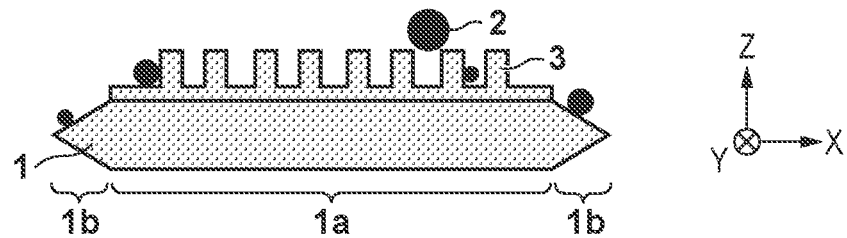
FIGS. 6A to 6F are schematic views for explaining steps of a foreign particle removing method of the second embodiment in chronological order.
Figure 6B:
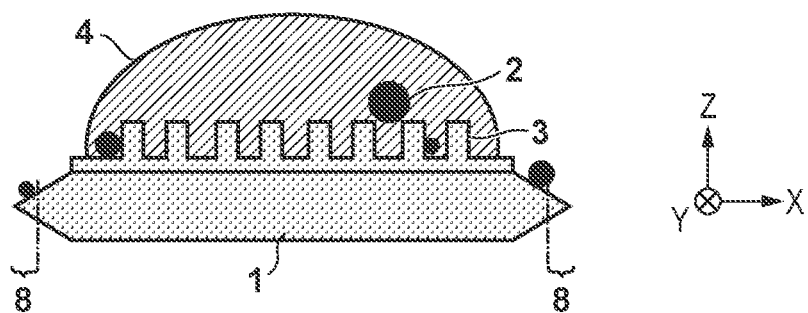
Figure 6C:
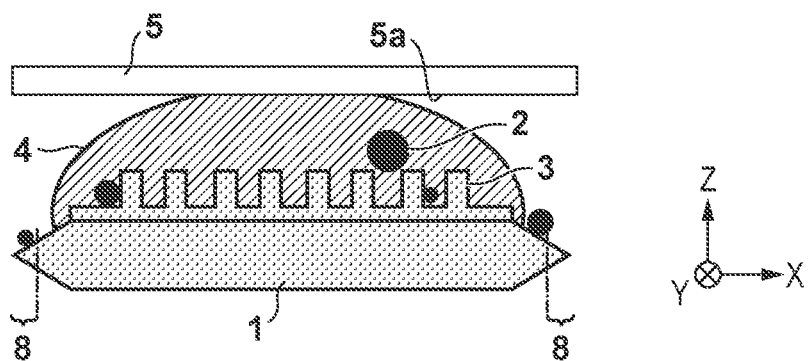
Figure 6D:
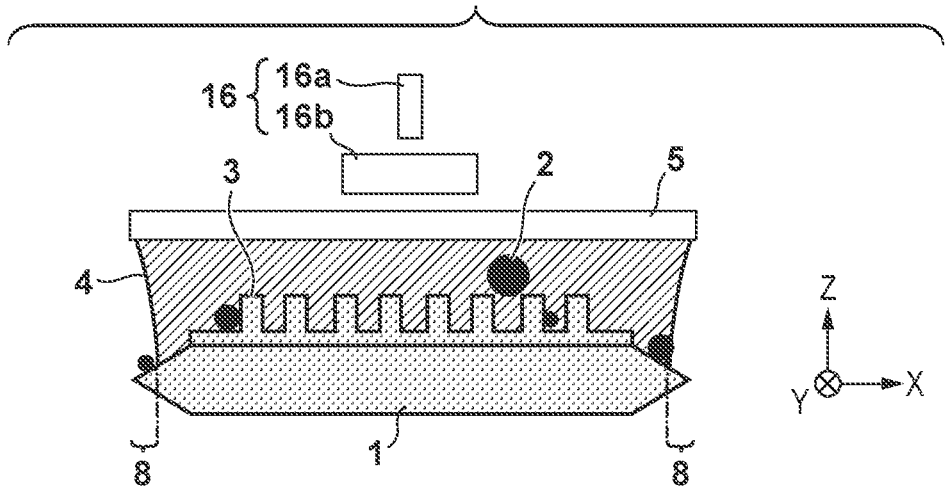
Figure 6E:
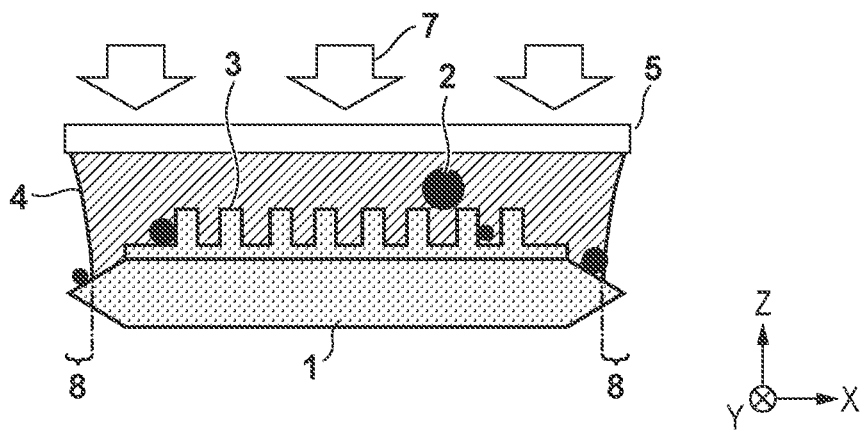
Figure 6F:
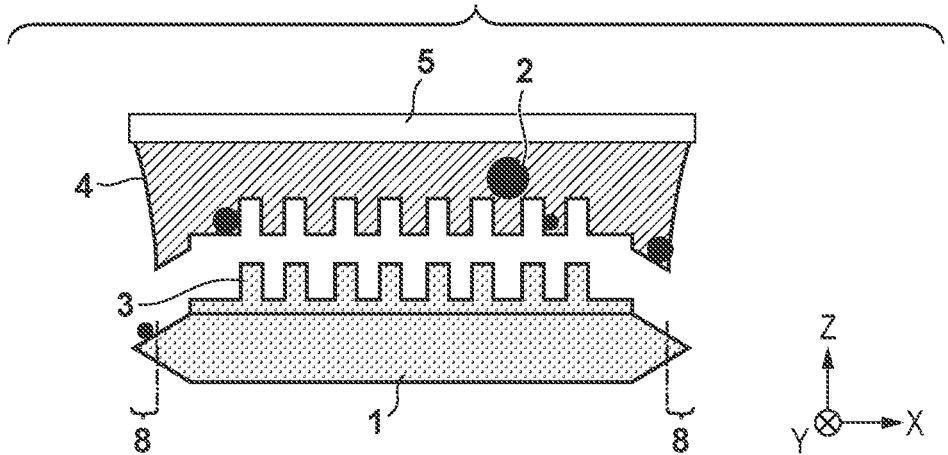

In the pressing step, as shown in FIG. 3A, if the template 5 is pressed against the composition 4 on the target member 1 in a state in which the template 5 and the target member 1 are inclined relative to each other, it may become difficult to spread the composition 4 over the whole target range of the target member 1. Consequently, as shown in FIG. 3B, the foreign particle 2 sometimes remains on the target member 1 (for example, the bevel portion 1b) even after a separation step (to be described later) is performed. Also, the composition 4 extends outside the target range of the target member 1 and the extended portion of the composition 4 remains as a foreign particle on the target member 1 after the separation step in some cases.

In the pressing step of this embodiment, therefore, it is possible to control the parallelism between the template 5 and the target member 1 and/or the force of pressing the template 5 against the composition 4 on the target member 1, so that the composition 4 spreads over the whole target range of the target member 1. The parallelism and/or the pressing force can also be so controlled that the composition 4 does not extend outside the target range of the target member 1. For example, the parallelism between the template 5 and the target member 1 can be controlled by adjusting the relative postures (relative inclinations) of the template 5 and the target member 1, such that a press surface 5a of the template 5 and the upper surface of the target member 1 become parallel. The press surface 5a of the template 5 is a surface (for example, a lower surface) to be pressed against the composition 4 on the target member 1. Note that the parallelism and the pressing force can be controlled by a driving mechanism for driving the target member 1 and the template 5 relative to each other.

In the pressing step of this embodiment, as shown in FIG. 2D, it is also possible to control the pressing (for example, the parallelism and/or the pressing force) of the template 5 against the composition 4 on the target member 1 while observing the spread of the composition 4 on the target member 1 by an image capturing device 16. The image capturing device 16 includes a camera 16a and an observation optical system 16b, and can be so configured as to capture an image of the whole target range of the target member 1 in an image capturing field. This makes it possible to control the pressing of the template 5 against the composition 4 on the target member 1 so that the composition 4 spreads over the target range of the target member 1 and/or the composition 4 does not extend outside the target range of the target member 1. The pressing step can also be controlled by time management, instead of the result of observation by the image capturing device 16.

Figure 2E:
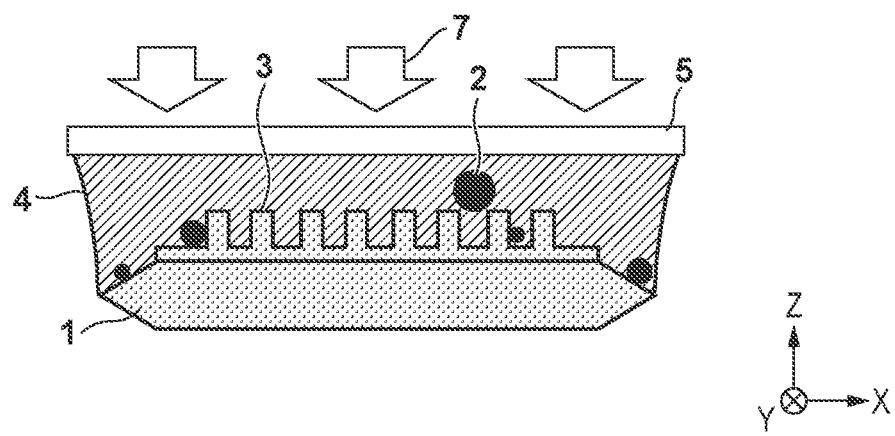

Then, in step S14 (a curing step), as shown in FIG. 2E, the composition 4 is cured by giving energy 7 to the composition 4 in a state in which the composition 4 on the target member 1 and the template 5 are in contact with each other. For example, when a photo-curable resin (for example, an ultraviolet curable monomer) is used as the composition 4, light (ultraviolet light) as the energy 7 is emitted (given) to the composition 4 through the template 5. In this case, the template 5 is preferably formed by a material capable of transmitting light (ultraviolet light), such as quartz. The composition 4 is not limited to a material that cures when irradiated with ultraviolet light, and can also be a material that cures by a polymerization reaction when irradiated with another energy such as X-ray or visible light, or a material that cures by thermal energy.

Figure 2F:
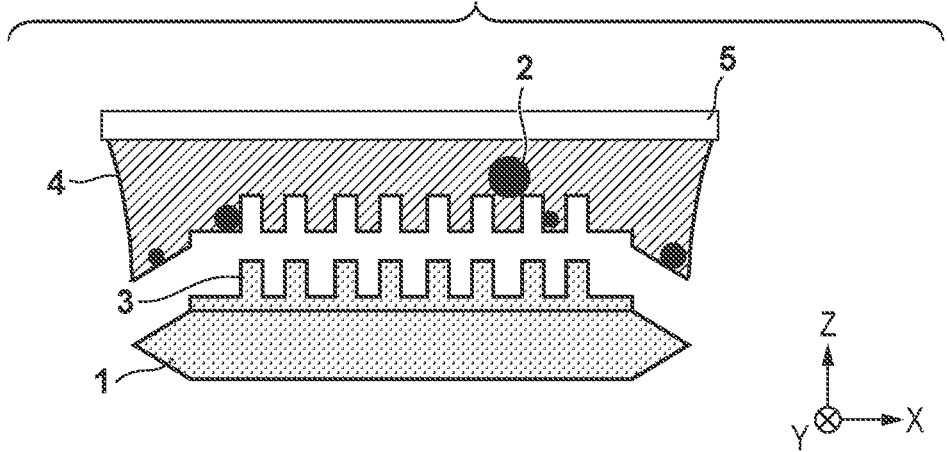

Subsequently, in step S15 (a separation step), as shown in FIG. 2F, the composition 4 is separated (released) from the target member 1 by extending the interval between the template 5 and the target member 1 in a state in which the composition 4 cured in the curing step and the template 5 adhere to each other. That is, the template 5 is separated together with the composition 4 from the target member 1 in a state in which the cured composition 4 including the foreign particles 2 and the template 5 adhere to each other. By using the separation step like this, it is possible to efficiently remove the foreign particles 2 on the target member 1 by simple processing, that is, to effectively clean the target member 1, and this is advantageous in throughput as well.

To perform the abovementioned separation step, the adhesion between the template 5 and the composition 4 must be higher than that between the target member 1 and the composition 4. Before the pressing step (step S13), therefore, a pre-process of improving the adhesion between the template 5 and the composition 4 is preferably performed on the template 5. This pre-process can include a film formation step of forming (applying) an adhesive film (adhesive layer) that adheres to the composition 4, on the surface (the press surface 5a) of the template 5. This film formation process can be performed by a general thin film formation method such as spraying, vapor deposition, or spin coating. The pre-process (an application process) can also be performed by an external apparatus of the foreign particle removing apparatus before the template 5 is loaded into the foreign particle removing apparatus.

The wettability of the surface (the press surface 5a) of the template 5 is preferably as high as possible so that air bubbles are not involved between the template 5 and the composition 4 in the pressing step and/or the composition 4 easily spreads on the template 5. That is, the contact angle between the template 5 and the composition 4 on the target member 1 is preferably decreased as much as possible in the pressing step. The allowable range of the contact angle between the template 5 and the composition 4 is preferably 2° or less, and more preferably 1° or less. This allowable range is favorably smaller than the contact angle between the target member 1 and the composition 4 by about 0.5° to 1°. For example, when a fluorine-based separation layer is formed on the target member 1, the contact angle between the target member 1 and the composition 4 does not satisfy the above-described allowable range. Therefore, the spreading speed of the composition 4 on the template 5 is preferably increased by decreasing the contact angle between the template 5 and the composition 4 to 1° or less.

For this purpose, a process (lyophilization process (hydrophilization process)) of lyophilizing (hydrophilizing) the surface (the press surface 5a) of the template 5 with respect to the composition 4 can be performed on the template 5 before the pressing step (step S13). This lyophilization process includes a process of removing organic contamination components on the surface (the press surface 5a) of the template 5. Examples of the lyophilization process are baking, atmospheric plasma treatment, ashing, alkali cleaning, and ozone water washing. In this embodiment, the atmospheric plasma treatment that can be implemented with a simple apparatus configuration can be used as the removing process. By thus lyophilizing the surface (the press surface 5a) of the template 5, it is possible to decrease the contact angle between the template 5 and the composition 4 in the pressing step, and facilitate spreading of the composition 4 on the template 5. Note that the lyophilizing process can also be performed by an external apparatus of the foreign particle removing apparatus before the template 5 is loaded into the foreign particle removing apparatus.

Configuration of Template

A configuration example of the template 5 to be used in the foreign particle removing method of this embodiment will be explained below. FIGS. 4A and 4B are views showing the configuration example of the template 5. FIG. 4A is a view showing the template 5 from below (in the −Z direction), and FIG. 4B is an A-A sectional view of the template 5 shown in FIG. 4A.

The template 5 to be used in the foreign particle removing method of this embodiment can be so configured that the press surface 5a is a flat surface, and can also be configured so as to efficiently spread the composition 4 over the target range of the target member 1 in the pressing step (step S13). For example, in the pressing step (step S13), as the spread of the composition 4 approaches the edge of the target member 1, the bevel portion 1b of the target member 1 increases the interval between the template 5 and the target member 1, so the spreading rate of the composition 4 decreases. On the press surface 5a, therefore, the template 5 has a plurality of first groove portions 5b radially extending so as to guide (assist) the spread of the composition 4 in the pressing step. On the press surface 5a of the template 5, the plurality of first groove portions 5b can be arranged in positions corresponding to the bevel portion 1b of the target member 1.

A width W of each first groove portion 5b is preferably set at a width with which a predetermined capillary force can be generated for the composition 4, and can be set at a few ten μm to a few hundred nm. A length L in the radial direction of each first groove portion 5b is preferably set to be larger than the length of the bevel portion 1b of the target member 1, and can be set at, for example, 1 mm or more. As an example, each first groove portion 5b of the template 5 has a width W of 100 nm, a length L of 2 mm, and a depth of 100 nm. By forming the plurality of first groove portions 5b on the template 5, it is possible to efficiently spread the composition 4 over the target range of the target member 1 by using the capillary force generated in each first groove portion 5b.

On the press surface 5a, the template 5 can also have a second groove portion 5c formed into the shape of a frame so as to stop the spread of the composition 4 in the pressing step. The second groove portion 5c can be arranged in a position corresponding to the outer circumference of the target range of the target member 1 (for example, the edge of the target member 1). In the example shown in FIGS. 4A and 4B, the whole of the circular target member 1 is the target range, so the second groove portion 5c of the template 5 is formed into a circumferential shape (for example, a circular shape) along the edge of the target member 1. By forming the second groove portion as described above on the template 5, it is possible to stop the spread of the composition 4 within the target range of the target member 1, and avoid the composition 4 from extending outside the target range.

Configuration of Foreign Particle Removing Apparatus

A configuration example of a foreign particle removing apparatus 10 will be explained below. FIG. 5 is a schematic view showing the configuration example of the foreign particle removing apparatus 10 of this embodiment. The foreign particle removing apparatus 10 of this embodiment is an apparatus that removes foreign particles on the target member 1 by executing the foreign particle removing method described above with reference to FIGS. 1 and 2A to 2F. The foreign particle removing apparatus 10 can include, for example, a stage 11, a holding device 12, a supply device 13, a first processing device 14, a second processing device 15, an image capturing device 16, a curing device 17, and a control device 18. The control device 18 is configured by a computer including a processor such as a CPU or an MPU or a logic circuit, and a storage device such as a memory, and controls a foreign particle removing process of removing foreign particles on the target member 1 by controlling each device of the foreign particle removing apparatus 10. The control device 18 can also include a communication device for communicating with an external apparatus. Note that the CPU is the abbreviation for Central Processing Unit, and the MPU is the abbreviation for Micro Processing Unit.

The stage 11 is capable of holding the target member 1 (a first member) as an object of foreign particle removal by a vacuum suction force or an electrostatic force, and movable in the X and Y directions on a baseplate BP. That is, the stage 11 is a mechanism that moves in the X and Y directions while holding the target member 1. In this embodiment, the stage 11 is so configured as to drive the target member 1 in only the X and Y directions. However, the stage 11 can also be so configured as to drive in the Z direction and the rotational direction of each axis. The holding device 12 is a mechanism that holds the template 5 (a second member) by a vacuum suction force or an electrostatic force, and drives the template 5 in the Z direction. In this embodiment, the holding device 12 is so configured as to drive the template 5 in only the Z direction. However, the holding device 12 may also be so configured as to drive the template 5 in the X and Y directions and the rotational direction of each axis. The stage 11 and the holding device 12 can form a driving mechanism (driving device) for driving the target member 1 and the template 5 relative to each other.

The supply device 13 is a mechanism that supplies (discharges or applies) the liquid composition 4 on the target member 1. When the supply device 13 supplies the composition 4 on the target member 1, the stage 11 places the target member 1 below the supply device 13. The first processing device 14 is a mechanism that performs a lyophilizing process on the target member 1. When the first processing device 14 performs the lyophilizing process on the target member 1, the stage 11 places the target member 1 below the first processing device 14. The second processing device 15 is a mechanism that performs a film formation process and the lyophilizing process on the template 5. The second processing device 15 of this embodiment is supported by a moving mechanism 19 movable in the X and Y directions on the baseplate BP. When the second processing device 15 performs the film formation process and the lyophilization process on the template 5, the moving mechanism 19 places the second processing device 15 below the template 5.

The image capturing device 16 is a mechanism for observing (capturing an image of) the spread of the composition 4 on the target member 1 in the pressing step described above. The image capturing device 16 can include the camera 16a (an image sensor) and the observation optical system 16b. In this example shown in FIG. 5, the image capturing device 16 is so configured as to capture an image of the spread of the composition 4 on the target member 1, via a mirror MR and the template 5. The curing device 17 is a mechanism for curing the composition 4 on the target member 1 in the above-described curing step. The curing device 17 can include an energy source 17a for emitting energy (for example, ultraviolet light) for curing the composition 4, and an irradiation optical system 17b that irradiates the composition 4 on the target member 1 with the energy emitted from the energy source 17a. In the example shown in FIG. 5, the curing device 17 cures the composition 4 on the target member 1 by irradiating the composition 4 with the energy, via the mirror MR and the template 5.

Operations of Foreign Particle Removing Apparatus

Operation examples of the foreign particle removing apparatus 10 of this embodiment will be explained below. A series of operations of the foreign particle removing apparatus 10 are executed by the control device 18 by transmitting a signal to each device.

Operation from Loading of Target Member to Supply Step

First, a conveyor mechanism (not shown) conveys the target member 1 onto the stage 11, and the stage 11 holds the target member 1 (a preparation step). Then, the stage 11 places the target member 1 below the first processing device 14 by driving the target member 1, and the first processing device 14 performs a lyophilization process on the target member 1. As this lyophilization process, the first processing device 14 can execute a process properly selected from, for example, baking, plasma ashing, atmospheric plasma processing, and alkali or ozone water washing, each of which can remove organic contamination components on the target member 1.

Then, after the stage 11 places the target member 1 below the supply device 13 by driving the target member 1, the supply device 13 supplies the liquid composition 4 on the target member 1 (the supply step). The supply device 13 can supply the composition 4 on the target member 1 by a method appropriately selected from, for example, an inkjet method, a dispenser method, and a printing method. Note that in the example shown in FIG. 5, the first processing device 14 and the supply device 13 are formed as constituent elements of the foreign particle removing apparatus 10. However, the first processing device 14 and/or the supply device 13 can also be formed as an external element (external apparatus) of the foreign particle removing apparatus 10. In this case, the target member 1 on which the lyophilization process and/or the supply of the composition 4 is performed outside the foreign particle removing apparatus 10 is loaded into the foreign particle removing apparatus 10.

The supply amount of the composition 4 to be supplied on the target member 1 by the supply device 13 will be explained below. The control device 18 obtains information (to be also referred to as foreign particle information hereinafter) indicating the size of a foreign particle adhered on the target member 1. This foreign particle information can contain information indicating a typical size of foreign particles obtained by measuring the sizes of foreign particles on the target member 1 by using an external inspection apparatus. The typical size of foreign particles can be a maximum size of foreign particles adhered on the target member 1, and can also be an average size thereof. When there are a plurality of target members 1, a typical size can be obtained for each target member 1. From the viewpoint of throughput, however, it is also possible to obtain a typical size from several target members 1 extracted as samples (representatives) from the plurality of target members 1. In this case, a maximum size or an average size of foreign particles on the several extracted target members 1 can be used as a typical size.

The control device 18 also obtains information (to be also referred to as pattern information hereinafter) indicating the height (for example, the height of concave and convex portions) of the pattern 3 formed on the target member 1. The pattern information can be information indicating the measurement result of the height of the pattern 3 of the target member 1, and can also be design information of the pattern 3 of the target member 1.

Then, based on the foreign particle information and the pattern information, the control device 18 decides the supply amount of the composition 4 so that the film thickness T of the composition 4 to be formed between the target member 1 and the template 5 through the above-described pressing step satisfies equation (1) below. "α" in equation (1) can appropriately be set between 1 and 100, and α=1.5 is set in this embodiment by taking account of cure shrinkage of the composition 4 in the curing step and the measurement accuracy of the sizes of foreign particles. The control device 18 controls the supply device 13 by transmitting an instruction signal corresponding to the decided supply amount of the composition 4 to the supply device 13.

$$T=(\text{maximum size of foreign particles}+\text{height of pattern 3})\times\alpha,\ \alpha<1 \quad (1)$$

Operation from Loading of Template to Pressing Step

A conveyor mechanism (not shown) conveys the template 5 onto the holding device 12, and the holding device 12 holds the template 5. Then, the moving mechanism 19 places the second processing device 15 below the template 5, and the second processing device 15 performs a film formation process on the template 5. The film formation process is a process of forming an adhesive film (adhesive layer) for improving the adhesion between the template 5 and the composition 4, on the press surface 5a of the template 5, and can include surface treatment such as silane coupling treatment, silazane treatment, or deposition of a thin organic film. When an adhesive film like this is formed on the press surface 5a of the template 5, it is possible to adhere the template 5 and the composition 4 and completely separate (release) the template 5 together with the composition 4 from the target member 1 in the above-described separation step. That is, it is possible to efficiently and reliably remove foreign particles from the target member 1. Note that the formation of the adhesive film may also be omitted depending on the components of the composition 4 or the configuration and material of the template 5.

Subsequently, the second processing device 15 performs a lyophilization process on the template 5. The second processing device 15 can execute, as the lyophilization process, a process appropriately selected from, for example, baking, plasma ashing, atmospheric plasma treatment, and alkali or ozone water washing, each of which can remove organic contamination components on the template 5. Note that the lyophilization process can be omitted if the surface of the above-described adhesive layer is sufficiently lyophilic. When performing the lyophilization process, the etching amount is preferably so selected as to remove contamination components in the top surface layer as long as the adhesive layer is not damaged. Note also that in the example shown in FIG. 5, the second processing device 15 is formed as a constituent element of the foreign particle removing apparatus 10. However, the second processing device 15 can also be formed as an external element (external apparatus) of the foreign particle removing apparatus 10. In this case, the template 5 having undergone the film formation process and/or the lyophilization process outside the foreign particle removing apparatus 10 is loaded into the foreign particle removing apparatus 10.

Then, after the stage 11 places (positions) the target member 1 below the template 5 by driving the target member 1, the holding device 12 moves down the template 5 and presses the template 5 against the composition 4 on the target member 1 (the pressing step). The time of the pressing step (that is, the time during which the composition is spread on the target member 1) can properly be set in accordance with the material, properties, and the like of the composition 4 so that the composition 4 can sufficiently enclose foreign particles within the target range of the target member 1.

In the pressing step, while the image capturing device 16 is observing uniformity/nonuniformity of the spread of the composition 4 on the target member 1, the pressing (for example, the parallelism and/or the pressing force) of the template 5 against the composition 4 on the target member 1 can be controlled. For example, the control device 18 can detect the outer circumference of the composition 4 and/or the edge of the target member 1 by performing well-known image processing on an image obtained from the image capturing device 16, thereby observing (monitoring) uniformity/nonuniformity of the spread of the composition 4 on the target member 1. If the nonuniformity of the spread of the composition 4 is detected, the control device 18 causes the stage 11 and the holding device 12 to control the relative postures of the template 5 and the target member 1 and/or the pressing force on the template 5 so as to correct the nonuniformity. This makes it possible to uniformly spread the composition 4 over the target range of the target member 1, and reliably remove foreign particles on the bevel portion 1b included in the target range as well.

In the pressing step, a gas for accelerating disappearance of air bubbles involved between the template 5 and the target member 1 and/or avoiding defective curing of the composition 4 caused by inhibition of oxygen can be supplied from a gas supply nozzle (not shown) formed in the holding device 12. Examples of the gas are He, $H_2$, and a gas mixture thereof. However, even when air bubbles are involved between the template 5 and the composition 4, the gas need not be supplied from the gas supply nozzle if the adhesion between the template 5 and the composition 4 has no problem.

Operation from Curing Step to Release Step

When the composition 4 has spread over the target range of the target member 1 in the pressing step, the control device 18 transmits a signal giving an instruction to cure the composition 4 to the curing device 17. Upon receiving this signal, the curing device 17 emits energy (for example, ultraviolet light) for curing the composition 4 from the energy source 17a, and irradiates the composition 4 with this energy via the irradiation optical system 17b, the mirror MR, and the template 5 (the curing step). As a consequence, the composition 4 between the template 5 and the target member 1 can be cured.

In the energy source 17a, a combination of the material and the wavelength can appropriately be selected so that the emitted energy can be transmitted through the template 5. In this embodiment, the template 5 is made of quartz, so ultraviolet light having a wavelength of 365 nm is adopted as the energy to be emitted from the energy source 17a. Note that the energy to be emitted from the energy source 17a is not limited to the ultraviolet light having a wavelength of 365 nm, and it is also possible to adopt, for example, visible light, ultraviolet light having a wavelength other than 365 nm, infrared light, X-ray, radiation, or an electron beam, in accordance with the materials of the template 5 and the composition 4.

In the curing step, it is possible to appropriately set the energy intensity (light intensity) with which the composition 4 is irradiated and the irradiation time (exposure time), so that the composition 4 can sufficiently cure, that is, the composition 4 cures to the target hardness. The curing rate of the composition 4 can change in accordance with the amount of oxygen in the surrounding atmosphere. Therefore, it is also possible to detect the amount of oxygen in the peripheral atmosphere by using a sensor or the like, and set the energy intensity and/or the irradiation time based on the detection result.

In the abovementioned step, the composition 4 on the target member 1 entraps (encloses) foreign particles within the target range of the target member 1 by spreading over the target range by the capillary force and the wettability, and becomes separable from the target member 1 by shrinkage by curing (cure shrinkage).

Then, the holding device 12 raises the template 5 and separates the template 5 from the target member 1 (the separation step). Since the template 5 and the cured composition 4 adhere to each other in this state, the composition 4 is also separated together with the template 5 from the target member 1. The rate at which the template and the target member 1 are separated can be so set that the pattern of the target member 1 is not damaged. By thus separating the template 5 together with the composition 4 from the target member 1, it is possible to efficiently remove foreign particles on the target member 1 with simple processing, and this can be advantageous in throughput as well.

When separating the template 5 and the composition 4 from the target member 1, the target member 1 may be electrified (called release electrification) and may attract surrounding foreign particles by the electrostatic force in some cases. Therefore, the separation step is preferably executed while removing static electricity from the template 5, the composition 4 and/or the target member 1 by using an ionizer (not shown). Note that the composition 4 is adhered on the template 5 after the separation step is performed, the template 5 can be replaced or cleaned when performing the foreign particle removing process on a new target member 1.

When the separation step is completed, the target member 1 is separated from the stage 11 and unloaded by the conveyor mechanism (not shown). In addition, the template 5 is separated from the holding device 12 and unloaded by the conveyor mechanism (not shown). When separating the target member 1 from the stage 11 and/or when separating the template 5 from the holding device 12, it is favorable to remove electrical charge by using an ionizer (not shown).

In the foreign particle removing method of this embodiment as described above, after the liquid composition 4 is supplied on the target member 1, the template 5 is pressed against the composition 4 such that the composition 4 spreads over the target range of the target member 1 and entraps foreign particles within the target range. Then, the composition 4 is cured in a state in which the template 5 and the composition 4 on the target member 1 are in contact with each other, and the template 5 is separated together with the cured composition 4 from the target member 1 in a state in which the template 5 and the composition 4 adhere to each other. Consequently, it is possible to efficiently remove the foreign particles 2 on the target member 1 with a simple process, and this is advantageous in throughput as well.

Second Embodiment

The second embodiment according to the present invention will be explained below. This embodiment basically takes over the first embodiment and can follow the first embodiment except items to be explained below.

A bevel portion 1b (a peripheral portion) of a target member 1 such as a wafer or a substrate sometimes includes an edge region having little influence on pattern formation in a subsequent lithography step. An edge region like this is also called an edge exclusion region (to be also referred to as an EE region hereinafter), and can be understood as a region excluded from evaluation of the presence/absence of a foreign particle in the pattern formation.

FIGS. 6A to 6F are schematic views for explaining steps of a foreign particle removing method of this embodiment in chronological order. These steps shown in FIGS. 6A to 6F respectively correspond to the steps shown in FIGS. 2A to 2F described earlier, and are similar to the steps shown in FIGS. 2A to 2F of the first embodiment. However, the target range of the target member 1 shown in FIGS. 6A to 6F differs from that shown in FIGS. 2A to 2F.

In this embodiment, the target range (a range within which foreign particles must be removed) of the target member 1 is so set as not to include an EE region 8. That is, the target range of the target member 1 is set as a range including a pattern portion 1a and a part of the bevel portion 1b from which the EE region 8 is excluded. A template 5 to be used when the EE region 8 is taken into account can be set to have a size larger than the target range of the target member 1, and can also be set to have a size smaller than the target member 1 itself. To facilitate handling of the template 5, the template 5 favorably has the same size as or a size larger than that of the target member 1.

Third Embodiment

The third embodiment according to the present invention will be explained below. In this embodiment, a system 100 including a foreign particle removing apparatus 10 explained in the first embodiment will be explained. This embodiment basically takes over the first embodiment and can follow the first embodiment except items to be explained below. This embodiment can also take over the second embodiment.

Figure 7:
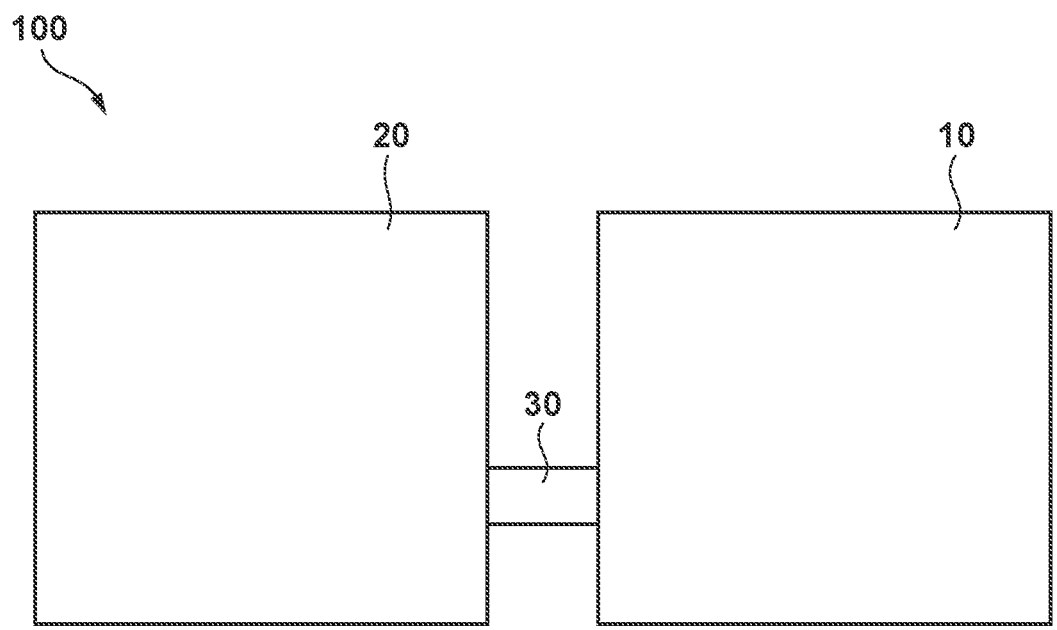
FIG. 7 is a schematic view showing a configuration example of a system including a foreign particle removing apparatus and a formation apparatus.

FIG. 7 is a schematic view showing a configuration example of the system 100 of this embodiment. The system 100 of this embodiment includes the foreign particle removing apparatus 10 and a formation apparatus 20. In the system 100 of this embodiment, a conveyor apparatus 30 connects the foreign particle removing apparatus 10 and the formation apparatus 20 by inline, and conveys a target member 1, from which foreign particles are removed by the foreign particle removing apparatus 10, into the formation apparatus 20.

As explained in the first embodiment, the foreign particle removing apparatus 10 is an apparatus for removing foreign particles on the target member 1. As described above, the target member 1 can be a substrate on which a pattern is formed by the formation apparatus 20 and/or an original plate having a pattern to be transferred onto a substrate by the formation apparatus 20. The formation apparatus 20 is an apparatus for forming a pattern on a substrate by using the target member 1 from which foreign particles are removed by the foreign particle removing apparatus 10. The formation apparatus 20 of this embodiment can be configured as a lithography apparatus for transferring a pattern of an original plate onto a substrate. For example, when the target member 1 is a substrate, the formation apparatus 20 transfers a pattern onto the substrate from which foreign particles are removed by the foreign particle removing apparatus 10. When the target member 1 is an original plate, the formation apparatus 20 transfers a pattern of the original plate from which foreign particles are removed by the foreign particle removing apparatus 10 onto a substrate. Examples of the lithography apparatus configuring the formation apparatus 20 are an exposure apparatus for exposing a substrate with pattern light having passed through an original plate (mask or reticle), and an imprint apparatus for forming a pattern of an imprint material on a substrate by using an original plate (mold).

Next, an operation example of the system 100 of this embodiment will be explained. In this embodiment, an example in which the target member 1 from which foreign particles are removed by the foreign particle removing apparatus 10 is a substrate and the formation apparatus 20 is an imprint apparatus will be explained.

A substrate is loaded into the system 100 from a coater/developer apparatus. The coater/developer apparatus can be connected inline to the foreign particle removing apparatus 10 and the formation apparatus 20 in the system 100, and can also stand alone. However, the coater/developer apparatus is preferably connected inline from the viewpoints of foreign particle adhesion and contamination. In the coater/developer apparatus, a substrate is coated with a mask material such as SOC/SOG, and conveyed to the foreign particle removing apparatus 10 connected inline.

In the system 100 of this embodiment, the foreign particle removing apparatus 10 performs a foreign particle removing process on a substrate before the substrate is loaded into the formation apparatus 20 (an imprint apparatus). This foreign particle removing process is explained in the first embodiment, so an explanation thereof will be omitted. The substrate having undergone the foreign particle removing process performed by the foreign particle removing apparatus 10 is conveyed into the formation apparatus 20 connected inline to the foreign particle removing apparatus 10, and a pattern formation process (imprint process) is performed. In this imprint process, an imprint material is supplied on the substrate, and a quartz mold (template) on which fine concave and convex portions are formed is brought into contact with the imprint material on the substrate. Then, the imprint material is cured in the state in which the imprint material on the substrate and the mold are in contact with each other, and the mold is separated (released) from the cured imprint material on the substrate. Consequently, the pattern of the mold is transferred onto the imprint material on the substrate, so the pattern of the cured product of the imprint material can be formed on the substrate.

In this imprint process, if a foreign particle exists (adheres) on the substrate, for example, if an inorganic foreign particle of about 80 nm or less exists, a mold having a pattern with concave and convex portions of about 20 nm may be damaged. Once the mold is damaged, a defect is formed on the pattern of the imprint material formed on the substrate in the subsequent imprint process using the mold. Accordingly, foreign particle management for a substrate and an original plate (mold) is a very important problem. The foreign particle removing apparatus 10 of this embodiment has a simple apparatus configuration and can remove very small foreign particles as well, and hence is very suitable as a method of solving this problem.

In the system 100 of this embodiment, after the foreign particle removing apparatus 10 performed the foreign particle removing process, the formation apparatus 20 (an imprint apparatus) performed the pattern formation process (imprint process). Consequently, it was confirmed that until an increase amount $\Delta DD$ of a defect density DD (defect/$cm^2$) became one defect/$cm^2$, the number of substrates to be processed rapidly increased from a few lots to a few hundred lots depending on the presence/absence of the foreign particle removing apparatus 10.

Embodiment of Article Manufacturing Method

An article manufacturing method according to the embodiment of the present invention is suitable for manufacturing an article, for example, a microdevice such as a semiconductor device or a device having a microstructure. The article manufacturing method of this embodiment includes a foreign particle removing step of removing foreign particles on a target member, a formation step of forming a pattern on a substrate, a processing step of processing the substrate on which the pattern is formed in the formation step, and a manufacturing step of manufacturing an article from the substrate processed in the processing step. In the foreign particle removing step, foreign particles on the target member are removed by using the abovementioned foreign particle removing method. The target member is a substrate on which a pattern is formed in the formation step and/or an original plate having a pattern to be transferred onto a substrate in the formation step. The manufacturing method further includes other known steps (oxidation, film formation, deposition, doping, planarization, etching, resist removal, dicing, bonding, packaging, and the like). The article manufacturing method of this embodiment is more advantageous than the conventional methods in at least one of the performance, quality, productivity, and production cost of the article.

When using an imprint apparatus as a formation apparatus for forming a pattern on a substrate in the formation step, the pattern of a cured product formed by the imprint apparatus is used permanently for at least some of various kinds of articles or temporarily when manufacturing various kinds of articles. The articles are an electric circuit element, an optical element, a MEMS, a recording element, a sensor, a mold, and the like. Examples of the electric circuit element are volatile and nonvolatile semiconductor memories such as a DRAM, an SRAM, a flash memory, and an MRAM and semiconductor elements such as an LSI, a CCD, an image sensor, and an FPGA. Examples of the mold are a mold for imprint and the like.

The pattern of the cured product is directly used as the constituent member of at least some of the above-described articles or used temporarily as a resist mask. After etching or ion implantation is performed in the substrate processing step, the resist mask is removed.

Figure 8A:
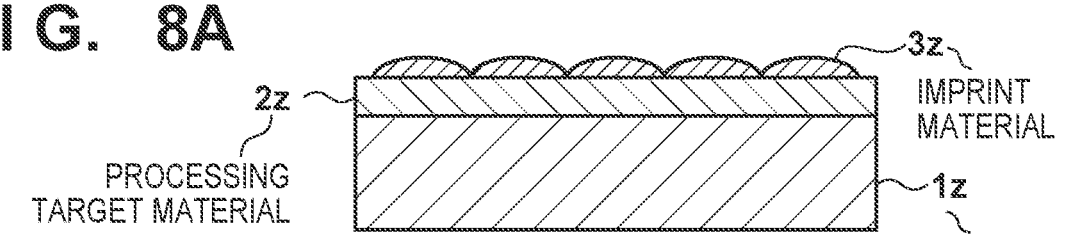
FIGS. 8A to 8F are views for explaining an article manufacturing method.

Next, a specific method of manufacturing an article will be described. In this embodiment, an example using an imprint apparatus (imprint process) will be explained. As shown in FIG. 8A, a substrate 1z such as a silicon wafer with a target material 2z to be processed, such as an insulator, formed on the surface is prepared. Next, an imprint material 3z is applied to the surface of the target material 2z by an inkjet method or the like. A state in which the imprint material 3z is applied as a plurality of droplets onto the substrate is shown here.

Figure 8B:
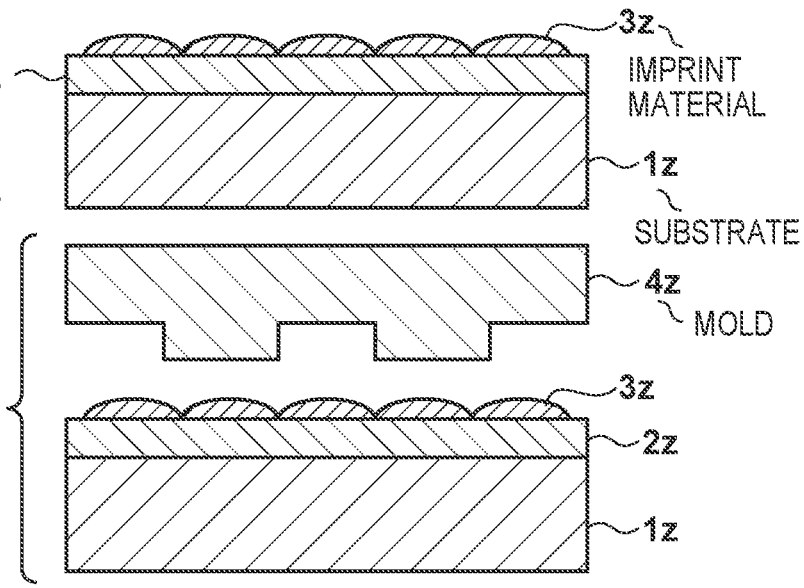
Figure 8C:
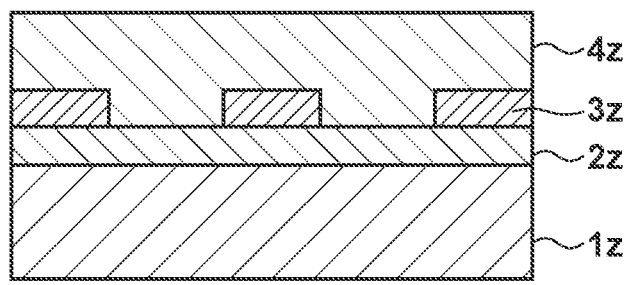

As shown in FIG. 8B, a side of a mold 4z for imprint, where a pattern with concave and convex portions is formed, is directed to face the imprint material 3z on the substrate. As shown in FIG. 8C, the mold 4z and the substrate 1z to which the imprint material 3z is applied are brought into contact with each other, and a pressure is applied. The gap between the mold 4z and the target material 2z is filled with the imprint material 3z. In this state, by irradiating the imprint material 3z with energy for curing through the mold 4z, the imprint material 3z is cured.

Figure 8D:
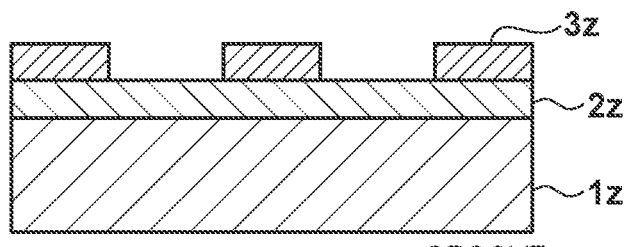

As shown in FIG. 8D, after the imprint material 3z is cured, the mold 4z is separated from the substrate 1z. Then, the pattern of the cured product of the imprint material 3z is formed on the substrate 1z. In the pattern of the cured product, the concave portion of the mold corresponds to the convex portion of the cured product, and the convex portion of the mold corresponds to the concave portion of the cured product. That is, the pattern with concave and convex portions in the mold 4z is transferred to the imprint material 3z. Note that a Residual Layer Thickness portion (an RLT portion, also called a residual film thickness) (not shown) having a thickness of about a few ten nm remains in the concave portion of the cured product.

Figure 8E:
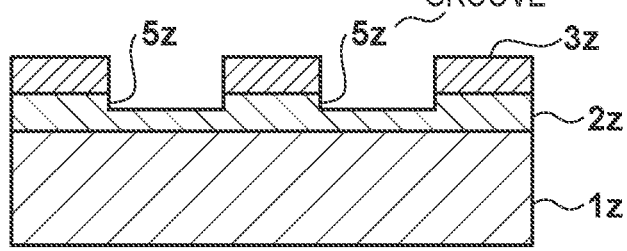
Figure 8F:
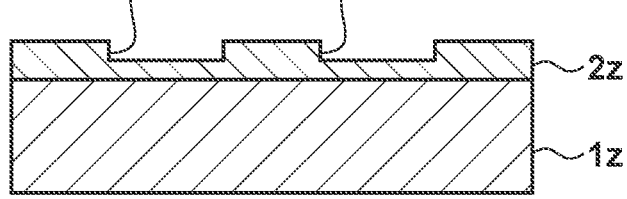

As shown in FIG. 8E, by etching the resultant material including the RLT portion by using the pattern of the cured product as an etching resistant mask, a portion of the surface of the target material 2z where the cured product does not exist or remains thin is removed to form a groove 5z. As shown in FIG. 8F, by removing the pattern of the cured product, an article with the grooves 5z formed in the surface of the target material 2z can be obtained. Here, the pattern of the cured product is removed. However, instead of removing the pattern of the cured product after processing, it may be used as, for example, an interlayer dielectric film included in a semiconductor element or the like, that is, a constituent member of an article.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-073675, filed Apr. 27, 2022, which is hereby incorporated by reference herein in its entirety.

What is claimed is:

1. A foreign particle removing method of removing a foreign particle on a first member, the method comprising:
    supplying a composition to a supply region on the first member;
    setting a target region wider than the supply region on the first member, and pressing a second member against the composition supplied on the first member in the supplying, such that the composition on the first member spreads over the target region and entraps a foreign particle in the target region;
    curing the composition on the first member after the pressing, in a state in which the composition and the second member are in contact with each other; and
    separating the second member from the first member after the curing, in a state in which the second member and the composition adhere to each other, thereby separating the composition from the target region of the first member,
    wherein the second member includes a press surface to be pressed against the composition, and also includes, on the press surface, a plurality of first groove portions radially extending so as to guide a spread of the composition in the pressing.

2. The method according to claim 1, wherein the target region includes at least a part of a bevel portion of the first member.

3. The method according to claim 1, wherein in the pressing, parallelism between the first member and the second member is controlled such that the composition supplied on the first member in the supplying spreads over the target region.

4. The method according to claim 1, wherein in the pressing, a force of pressing the second member against the composition supplied on the first member in the supplying is controlled such that the composition on the first member spreads over the target region.

5. The method according to claim 1, wherein a force of pressing the second member against the composition supplied on the first member in the supplying is controlled while observing a spread of the composition on the first member, such that the composition spreads over the target region.

6. The method according to claim 1, further comprising, before the supplying, performing, on the first member, a process of lyophilizing a surface of the first member with respect to the composition in a liquid state.

7. The method according to claim 1, further comprising, before the pressing, performing, on the second member, a process of improving adhesion between the composition and the second member.

8. The method according to claim 1, wherein the second member further includes, on the press surface, a frame-shaped second groove portion configured to stop a spread of the composition in the pressing.

9. The method according to claim 1, wherein the first member is a substrate on which a pattern is formed.

10. The method according to claim 1, wherein the first member is an original plate to be used to form a pattern on a substrate.

11. A formation method of forming a pattern on a substrate, the method comprising:
    removing a foreign particle on a first member using the foreign particle removing method according to claim 1; and
    forming a pattern on a substrate,
    wherein the first member for which the removing is performed is one of the substrate on which a pattern is formed in the forming or an original plate including a pattern to be transferred onto the substrate.

12. An article manufacturing method comprising:
    forming a pattern on a substrate using the formation method according to claim 11;
    processing the substrate on which the pattern is formed; and
    manufacturing an article from the processed substrate.

13. The method according to claim 2, wherein in the supplying, the composition in a liquid state is supplied to a portion of the first member except the bevel portion.

* * * * *